United States Patent [19]

Sidler et al.

[11] Patent Number: 4,594,514

[45] Date of Patent: Jun. 10, 1986

[54] COPPERPLATE PRINTING DETECTION METHOD AND DEVICE THEREFOR

[75] Inventors: Thomas Sidler, St. Aubin; Daniel Gasser, St. Blaise, both of Switzerland

[73] Assignee: Compagnie Industrielle Radioelectrique, Switzerland

[21] Appl. No.: 462,338

[22] Filed: Jan. 31, 1983

[30] Foreign Application Priority Data

Mar. 8, 1982 [CH] Switzerland ........................ 1395/82

[51] Int. Cl.[4] .............................................. G06K 5/00

[52] U.S. Cl. ...................................... 250/556; 356/71

[58] Field of Search ............. 250/237 G, 231 SE, 550, 250/572, 556; 356/71; 382/7; 209/534

[56] References Cited

U.S. PATENT DOCUMENTS

| | | | |
|---|---|---|---|
| 2,827,822 | 3/1958 | Timms | 250/556 |
| 3,056,033 | 9/1962 | Shepard | 382/7 |
| 3,634,012 | 1/1972 | Mustert | 356/71 |
| 3,851,971 | 12/1974 | Koch | 356/71 |

FOREIGN PATENT DOCUMENTS

| | | | |
|---|---|---|---|
| 1911897 | 9/1970 | Fed. Rep. of Germany | 356/71 |

*Primary Examiner*—David C. Nelms
*Assistant Examiner*—James Gatto
*Attorney, Agent, or Firm*—Kane, Dalsimer, Kane, Sullivan and Kurucz

[57] ABSTRACT

A method is provided for observing, preferably through the medium of an optoelectronic pick-up, the carrier to be checked which is illuminated by a light beam having an angle of incidence of at least 45° through a rotary disc comprising alternately transparent and opaque sectors spaced from one another by a distance at least substantially equal to the distance measured between the lines of the copperplated printing formed on the carrier. The carrier image is formed in the plane of a detector by means of an optical system. If the carrier has a copperplate printing formed thereon, a moiré effect is observed. If the pick-up extends over several transparent sectors of the disc this moiré effect is converted electrically into a very pronounced periodic variation of the current delivered by the pick-up, at the sector passage frequency.

6 Claims, 2 Drawing Figures

COPPERPLATE PRINTING DETECTION METHOD AND DEVICE THEREFOR

BACKGROUND OF THE INVENTION

The present invention relates to a method of and a device for detecting a copperplate printing comprising a sequence of lines on a support, for instance a banknote or other currency paper.

DESCRIPTION OF THE PRIOR ART

Copperplate printing departs from other printing processes, notably the so-called offset printing, by an embossment. In actual practice, only authentic banknotes are copperplate printed. Hence the proposition consisting in checking the authenticity of banknotes by detecting this copperplating. To this end, a mechanical feeler is used which is associated with the movable core of a differential transformer having its primary winding energized by a generator supplying a carrier frequency modulated by the movements of the differential transformer core when this core is shifted as a consequence of the feeler movements travelling on a copperplate printed surface. Demodulating the resulting signal will thus permit of ascertaining the presence of a copperplate printing. With this type of detector it is possible to detect thickness differences of the order of one micron. However, this device is expensive, delicate to handle and liable to failure due to stain and dirt resulting from the physical contact between the feeler and the banknote, and furthermore its working speed is rather limited.

A known proposition consisted in detecting a copperplate engraving consisting of parallel lines, as formed on embossed banknotes, by resorting to optical means, i.e. without any physical contact (U.S. Pat. No. 3,634,012). This method consists in illuminating by turns the printed lines by means of a pair of identical and nearly horizontal light beams, on the one hand in a direction thereto, and comparing the amount of light received by two photoelectric cells respectively, the amount of light reflected across the lines being lower than the amount of light reflected parallel to said lines, in the case of copperplate engraving or printing, due to the shadow formed by the relief. However, this method is rather complicated and delicate to carry out and requires the use of mechanical means for alternating the beams, plus several mirrors and screens. The test surface must be perfectly flat and the surroundings perfectly free of any reflection. The light beams are directed through a tunnel. Besides, the angle of incidence of the beams must be relatively high.

SUMMARY OF THE INVENTION

It is the primary object of the present invention to detect a copperplate printing through its relief on a carrier, notably a banknote, without producing any physical contact with the support but through a method considerably simpler than those broadly mentioned hereinabove, while meeting considerably less restraining requirements.

The method of the present invention takes advantages of an optical effect. A photograph taken on a banknote illuminated by a nearly horizontal light beam shows periodic shadow areas putting in sharp contrast the relief of the copperplate printed portions. By shifting in front of the photograph a mask consisting of periodic black and transparent rays spaced apart by a distance equal to the distance measured between two adjacent lines of the copperplate printed area, a so-called watered or "moiré" effect is observed due to the simultaneous passage of dark strips and clear strips in all the mask slits or, in other words, to the corresponding periodicity of the dark lines on the banknotes and of the mask slits, a periodicity which does not exist on imitations. If on the other hand the same mask is shifted in front of a spurious banknote, for example one obtained by applying a photostatic reproduction process, this moiré or watered effect is not observed because there is no periodicity of dark and clear lines, or in all cases if a periodicity is observed it appears only very briefly.

The method of this invention therefore consists in illuminating the printed carrier with a light beam having an incidence angle of at least 45 degrees, observing the thus illuminated carrier through a rotary disc consisting of alternately transparent and opaque sectors having a relative angular spacing at least approximately equal to the distance existing between the lines constituting the copperplate printing, in order to ascertain a moiré effect denoting the presence of a copperplate printing.

In actual practice, this observation is made by using optoelectronic means in order to detect an electric beat corresponding to the moiré effect denoting the presence of a copperplate impression. This beat departs clearly from the irregular variation observed on a counterfeit banknote.

The device for carrying out the method of the present invention comprises a light source illuminating the carrier with an angle of incidence in the range of 45 to 80 degrees, a disc divided into alternately transparent and opaque sectors, a motor for rotatably driving said disc, a fixed photoelectric pick-up mounted in close proximity of the disc on the side thereof opposite said carrier, the sensitive surface of said pick-up covering several sectors of said disc, a lens system disposed between the illuminated carrier and the disc for forming an image of the illuminated portion of said carrier on said photoelectric pick-up, and a circuit for detecting the periodic variation of the current delivered by said photoelectric pick-up and corresponding to the presence of a copperplate printing.

To receive the moiré effect like the retina of the human eye the photoelectric pick-up must receive the image of several lines of the copperplate printing, i.e. cover several transparent lines. In fact, if the pick-up were scanned by only one transparent line at a time, it would deliver only an alternating current corresponding to the alternation of dark and transparent lines, this alternation existing also on imitations.

THE DRAWING

FIG. 1 is a diagrammatic illustration of the principle on which the method of the present invention is based, and FIG. 2 is a block diagram showing the detection device for carrying out the method of the present invention.

DESCRIPTION OF THE PREFERRED EMBODIMENT

Figure 1:
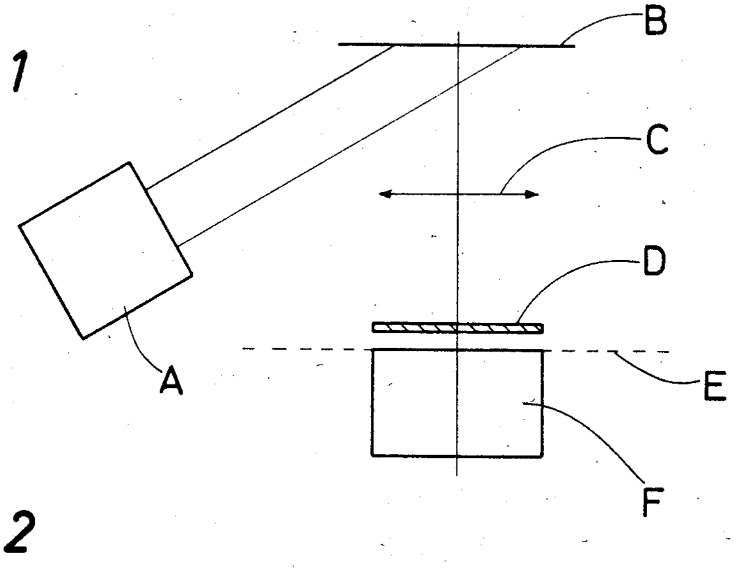

Referring first to FIG. 1 of the drawing, a collimated source A of visible or infrared collimated light illuminates the surface of a banknote B to be checked under an angle of incidence within the range of 45° to 80°. The banknote B is observed through the annular surface of a rotary disc D divided into alternately black or opaque and transparent sectors. For the opto-electronic observation use is made of a lens C forming an image of the illuminated area of the banknote B in a plane E in which an opto-electronic detector F is disposed and extends through several transparent lines of disc D. Under these conditions, the detector F detects a light signal of which the intensity varies at a frequency proportional to the rotational velocity and also to the number of transparent lines of the disk D. An optimal alternating signal is obtained when the sensitive surface of detector F covers several complete transparent lines of the disc. Thus, it is only necessary to convert this analogue signal into a digital signal and to count a predetermined number of pulses for ascertaining that a moiré effect has really been obtained as a consequence of a copperplate impression and not of the presence of another relief element, for example dirt or stain.

Figure 2:
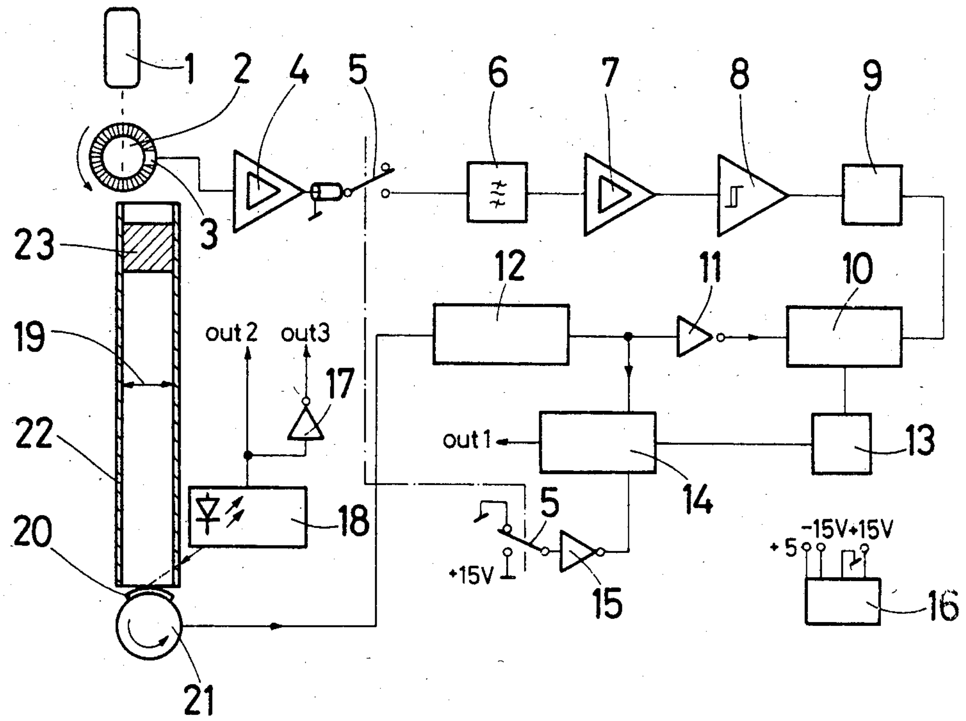

A device suitable for carrying out the method of this invention is illustrated diagrammatically in FIG. 2. The banknote 20 to be checked is driven in a manner known per se by a rotary drum 21 past a lens 19 having a focal length of 40 mm so as to form an image magnified 1.1 times on a pick-up 3 disposed behind a rotary disc 2 driven by a d.c. motor 1. To permit the necessary geometrical reduction the optical system 22 further comprises a pair of mirrors 23 for deflecting the light beam through an angle of 180°. The banknote 20 is illuminated by means of an infrared beam emitter 18 comprising an emitter diode generating a light beam collimated onto the banknote 20 with an angle of incidence of about 45°. The block 18 further comprises a state detector for signalling whether the diode is operating or not. The corresponding data are available at outputs OUT 2 and inverted OUT 3.

The d.c. motor 1 drives the disc 2 at a speed of about 2,170 r.p.m. The disc 2 has an outer diameter of 40 mm and an annular outer portion about 3 mm wide comprising 250 black lines alternating with 250 transparent lines, all the lines having the same width, about 0.5 mm. Just behind the disc 2 is a pick-up 3 consisting of a photodiode having a square receiving area of $3\times3=9$ square mm. This square receiving area covers a sequence of 7 to 8 lines. In fact, it was found that a sequence of at least 7 or 8 lines had to be covered for clearly observing the moiré effect. The frequency of the black and transparent line alternations at a fixed point is 9.04 kHz. The photodiode constituting the pick-up 3 and responsive to this alternation delivers a current varying at the same frequency. The moiré effect generates a regular and clearly perceived current variation, i.e. an alternating current of relatively great amplitude and having a frequency of 9.04 kHz. However, it is obvious that changing the motor speed or the number of lines on the disc would modify the current frequency accordingly.

The alternating current delivered by pick-up 3 is converted into an alternating voltage modulated by means of a current/voltage converter 4. The alternating voltage is filtered through a band-pass filter 6 having cutoff frequencies of 8.5 kHz and 11.8 kHz, respectively, and then amplified by means of a variable gain amplifier 7 delivering a signal of about one volt which can be processed by means of a trigger 8 having an adjustable trigger threshold. The amplitude of the alternating voltage illustrating the copperplating is 2 to 6 times greater than that of a signal produced by a banknote without copperplating, since this voltage is subordinate to the density of banknote copperplate printing and also of the position whereat the data is taken therefrom.

The trigger 8 operates between $-15$ V and $+15$ V. The pulses delivered by the trigger 8, which correspond to the recurrence of the moiré areas, are fed to an interface circuit 9 which converts them into pulses within the range of 0 to $+15$ V for driving a counter 10 consisting of a cascade arrangement of a pair of Johnson decades, so that up to 100 pulses can be counted. A manual selector 13 is provided for selecting the minimum number of pulses that the counter 10 must count for enabling a selection logic 14 to deliver a signal in pulse form at its output OUT 1 showing that the checked banknote is printed acording to the copperplate process, i.e. is an authentic banknote.

In addition, the rotary drum 21 is associated with an angular pick-up delivering a pulse to a shaping circuit 12 generating a validation or adjustable-reading window and covering one portion of the banknote area, i.e. determining the time period during which the information carried by the banknote will be read. This validation window is delivered to the selection logic circuit 14. In the absence of such validation window, the counter 10 is reset.

A double-throw switch 5 is provided for rendering the detection circuit inoperative while displaying its state at the selection logic 14 as illustrated in FIG. 2 by the position of the two contact arms of said switch 5. In this position the lower fixed contact of switch 5 emerges from the validation window on output OUT 1 of selection logic 14, if the detector is not triggered. Blocks 11, 15 and 17 are simple inverters. Block 16 illustrates the supply means for the circuit and motor.

Through a specific form of embodiment of the present invention has been disclosed and illustrated herein, it will readily occur to those conversant with the art that various modifications and changes may be brought thereto without departing from the basic principles of the invention as set forth in the appended claims.

What is claimed is:

1. Device for indentifying a banknote, which comprises a light source illuminating the carrier with an angle of incidence within the range of 45° to 80°, a disc comprising alternately transparent and opaque radial sectors, a motor for rotatably driving said disc, a fixed photoelectric pick-up mounted in close proximity of said disc on the side thereof opposite said carrier and having a sensitive surface area covering several sectors of said disc, a lens disposed between the illuminated carrier and the disc for forming an image of the illuminated portion of said carrier on said photoelectric pick-up, and circuit means for detecting the periodic variation of the current delivered by said photoelectric pick-up which corresponds to the presence of a copperplate printing.

2. The device of claim 1 for identifying a banknote or like currency paper, wherein the number of alternately opaque and transparent sectors of said disc and the rotational speed of said disc are such that the frequency of the alternation of opaque and transparent sectors as seen from said fixed photoelectric pick-up is about 9 kHz±1 kHz and that the photoelectric pick-up has a sensitive surface are covering from six to eight sectors of said disc, and preferably exactly six or eight sectors.

3. The device of claim 1, wherein said detection circuit means comprise a current to voltage converter, a bandpass filter for filtering the output of the converter, a trigger delivering pulses corresponding to each periodic variation of the alternating voltage delivered by said converter through said filter, a pulse counter and a circuit for selecting counted pulses for generating a signal as a function of a minimum number of predetermined counter pulses.

4. The device of claim 3, wherein said light source is a source of infrared light provided with a collimator.

5. The device of claims 2 or 3, wherein said band pass filter passes signals having frequencies between 8.5 and 11.8 kHz.

6. The device of claim 2, which comprises a drum for carrying along the banknotes to be checked and delivering during its rotation a signal utilized for generating a detection validating window.

* * * * *